(12) United States Patent
Howard

(10) Patent No.: US 8,875,621 B2
(45) Date of Patent: Nov. 4, 2014

(54) METHOD, CONTINUOUS APPARATUS, AND BURNER FOR PRODUCING A SURFACE-ROASTED PRODUCT

(76) Inventor: David Howard, Kellyville, OK (US)

( * ) Notice: Subject to any disclaimer, the term of this patent is extended or adjusted under 35 U.S.C. 154(b) by 314 days.

(21) Appl. No.: 12/836,786

(22) Filed: Jul. 15, 2010

(65) Prior Publication Data

US 2012/0015084 A1    Jan. 19, 2012

(51) Int. Cl.

| A21B 1/48 | (2006.01) |
|---|---|
| A23L 3/18 | (2006.01) |
| A47J 37/04 | (2006.01) |
| A47J 37/08 | (2006.01) |
| A23L 1/325 | (2006.01) |
| A23L 1/31 | (2006.01) |
| A23L 1/314 | (2006.01) |
| A23L 1/01 | (2006.01) |
| A23L 1/315 | (2006.01) |
| F23D 14/02 | (2006.01) |

(52) U.S. Cl.
CPC .............. *A47J 37/044* (2013.01); *A23L 1/325* (2013.01); *F23D 2900/14041* (2013.01); *A21B 1/48* (2013.01); *A23L 1/3103* (2013.01); *A23L 1/31445* (2013.01); *A23L 1/01* (2013.01); *A47J 37/08* (2013.01); *A23L 1/315* (2013.01); *F23D 14/02* (2013.01)
USPC .......................................... 99/443 C; 99/401

(58) Field of Classification Search
CPC ............ A23L 3/022; A21B 1/48; A21B 1/02; A47J 27/18; A47J 27/0814; A47J 27/0688; A47J 27/08; F24C 3/085; F24C 15/322; F24C 15/2007; F24C 15/08
USPC ....... 99/360, 443 C, 330, 389, 390, 391, 393, 99/401; 426/262, 523, 645, 392, 386, 486; 126/39 E, 21 A, 21 R, 19 R, 41 C
See application file for complete search history.

(56) References Cited

U.S. PATENT DOCUMENTS

| 2,210,069 | A | * | 8/1940 | Ensign .......................... 239/552 |
|---|---|---|---|---|
| 3,943,910 | A | | 3/1976 | White |
| 4,083,353 | A | * | 4/1978 | Petry ............................ 126/21 R |
| 4,203,553 | A | * | 5/1980 | Bachman et al. ............. 239/420 |
| 4,941,819 | A | * | 7/1990 | Stewart et al. ..................... 432/8 |
| 5,336,513 | A | | 8/1994 | Stuck et al. |
| 5,714,190 | A | | 2/1998 | Hughes et al. |
| 2004/0177769 | A1 | | 9/2004 | Kobayashi |

FOREIGN PATENT DOCUMENTS

| DE | 3743950 A1 | 6/1989 | |
|---|---|---|---|
| DE | 3743950 A1 * | 7/1989 | .............. A22B 5/08 |
| GB | 1124784 | 8/1968 | |

* cited by examiner

*Primary Examiner* — Henry Yuen
*Assistant Examiner* — Hemant Mathew
(74) *Attorney, Agent, or Firm* — GableGotwals

(57) ABSTRACT

An apparatus, a loop burner element, and a method for surface-roasting a food product wherein the roasting apparatus comprises (a) a conveyor which carries the food product and (b) at least one non-linear ribbon flame burner element or element assembly which preferably applies a ribbon flame to at least the upper and side surfaces of the food product as it is conducted through the roasting apparatus.

14 Claims, 4 Drawing Sheets

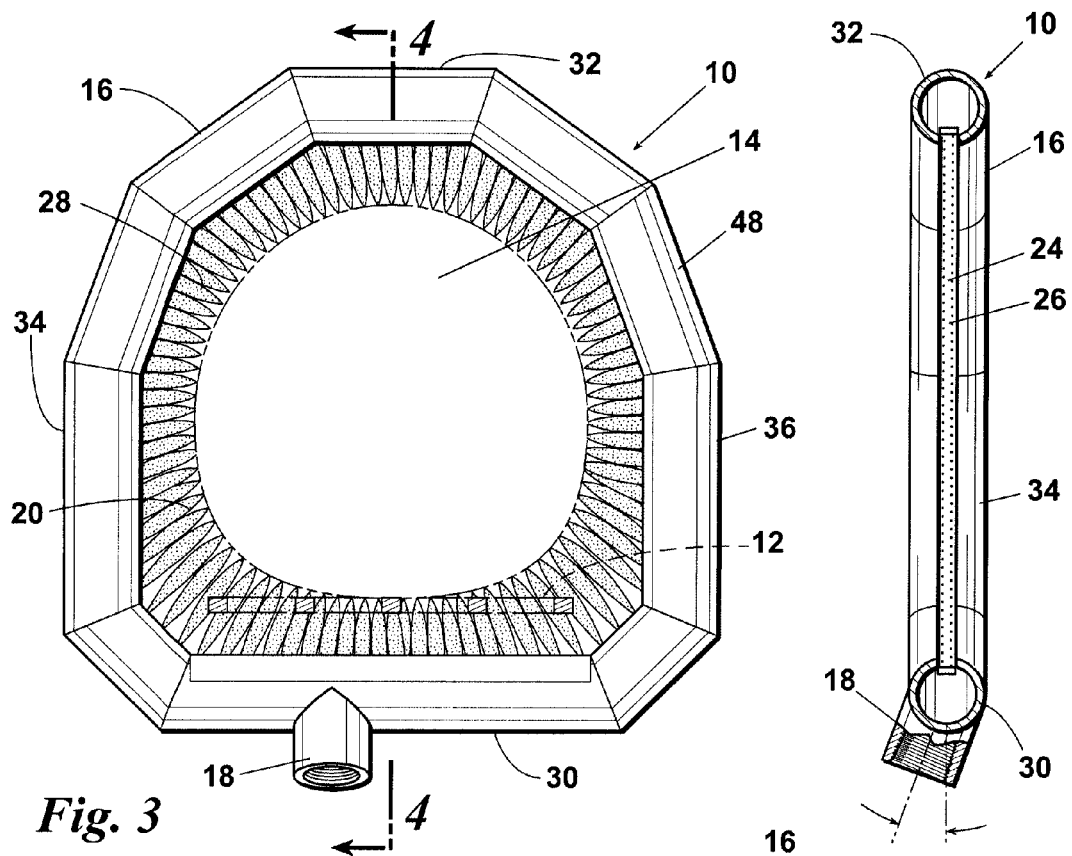
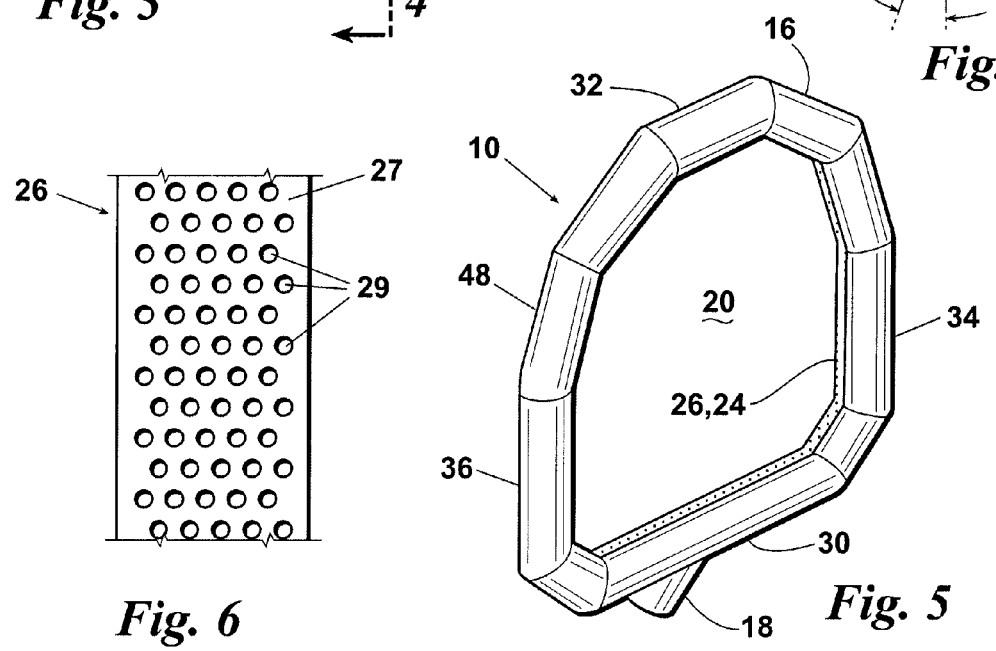

METHOD, CONTINUOUS APPARATUS, AND BURNER FOR PRODUCING A SURFACE-ROASTED PRODUCT

FIELD OF THE INVENTION

The present invention relates to continuous apparatuses, burners therefor, and methods for producing surface-roasted hams and other meat, poultry, fish, or vegetable products.

BACKGROUND OF THE INVENTION

It has become common practice for chefs in restaurants, and even in many homes, to use hand-held propane torches to singe or otherwise surface-roast cooked hams and other products to produce colors and color patterns, to caramelize honey, caramel, sugar glaze, or other surface coatings, and/or for other purposes.

Unfortunately, no automated continuous commercial apparatus or procedure has been available which is capable of producing products which faithfully resemble the products produced in restaurants and homes using hand-held propane cooking torches. Efforts to produce similar results using continuous infrared and convective ovens, for example, have been unsuccessful because, unlike the torch flame which physically enters into cracks or crevices when impinged or otherwise applied on the product surface, infrared or convective heat does not fully "see" into such surface features and anomalies and does not provide the same intense heating and temperature at the product surface as a torch flame.

Consequently, in order to produce ready-to-eat hams and other products for delicatessens and supermarkets having the same surface appearance and/or other characteristics, it has been necessary for the commercial suppliers to also manually treat the surface of each ham or other product piece on an individual basis using a hand-held torch. This is not only a time-consuming and costly process, but also poses a serious safety hazard for the employees performing the hand roasting operation and for other workers in the processing facility.

Consequently, a need exists for an automated continuous apparatus and method for producing comparable surface-roasted hams and other products wherein the automated apparatus and method will preferably eliminate the need for manual procedures using hand-held torches yet produce the same surface effects and other results.

SUMMARY OF THE INVENTION

The present invention satisfies the needs and alleviates the problems discussed above. In one aspect, there is provided an apparatus for surface-roasting a food product. The apparatus preferably comprises: (a) a housing; (b) a conveyor for carrying the food products through the housing; and (c) one or more ribbon flame burner elements or element assemblies positioned in the housing for discharging a ribbon flame for surface-roasting the food product. Each said ribbon flame burner elements or element assembly preferably comprises: an upper segment which extends laterally over the conveyor for discharging an upper portion of the ribbon flame toward a top portion of the food product; a first side segment which extends downwardly from a first end of the upper segment for discharging a first side portion of the ribbon flame toward a first side portion of the food product; and a second side segment which extends downwardly from a second end of the upper segment for discharging a second side portion of the ribbon flame toward a second side portion of the food product.

In another aspect, there is provided a burner for surface-roasting a food product. The burner preferably comprises: (a) a continuous conduit loop; (b) an interior opening which extends through and is surrounded by the continuous conduit loop; (c) a continuous flame slot provided in the continuous loop, the continuous flame slot facing radially inward toward the interior opening and the continuous flame slot surrounding the interior opening for discharging a continuous flame radially inward around a perimeter of the interior opening; and (d) a ribbon flame element positioned in the continuous flame slot such that the ribbon flame element surrounds the interior opening and the continuous flame around the perimeter of the interior opening is discharged from the ribbon flame element.

In another aspect, there is provided a method of processing a food product which preferably comprises the step of surface-roasting the food product by continuously delivering the food product through a roasting apparatus. The roasting apparatus preferably comprises: (a) a conveyor which carries the food product and (b) one or more ribbon flame burner elements or element assemblies which apply a ribbon flame to the food product. Each said ribbon flame burner element or element assembly preferably includes: an upper segment over the conveyor which applies an upper portion of the ribbon flame on the top portion of the food product; a first side segment which extends downwardly and applies a first side portion of the ribbon flame on a first side portion of the food product; and a second side segment which extends downwardly and applies a second side portion of the ribbon flame on a second side portion of the food product.

The non-linear ribbon flame burner provided by and used in present invention preferably forms a continuous loop through which the food product will be carried by the apparatus conveyor. The continuous loop preferably comprises the upper segment, first side segment, and second side segment of the non-linear burner as discussed above, as well as a lower segment which extends beneath the conveyor.

Further aspects, features, and advantages of the present invention will be apparent to those of ordinary skill in the art upon examining the accompanying drawings and upon reading the following Detailed Description of the Preferred Embodiments.

BRIEF DESCRIPTION OF THE DRAWINGS

FIG. 3 is an elevational front view of an embodiment 10 of an inventive loop burner element used in the inventive surface-roasting apparatus 2.

FIG. 4 is a cutaway elevational side view of the inventive loop burner element 10.

FIG. 5 is a perspective view of the inventive loop burner element 10.

FIG. 6 illustrates a ribbon flame-producing element 26 used in the inventive loop burner element 10.

DETAILED DESCRIPTION OF THE PREFERRED EMBODIMENTS

Figure 1:
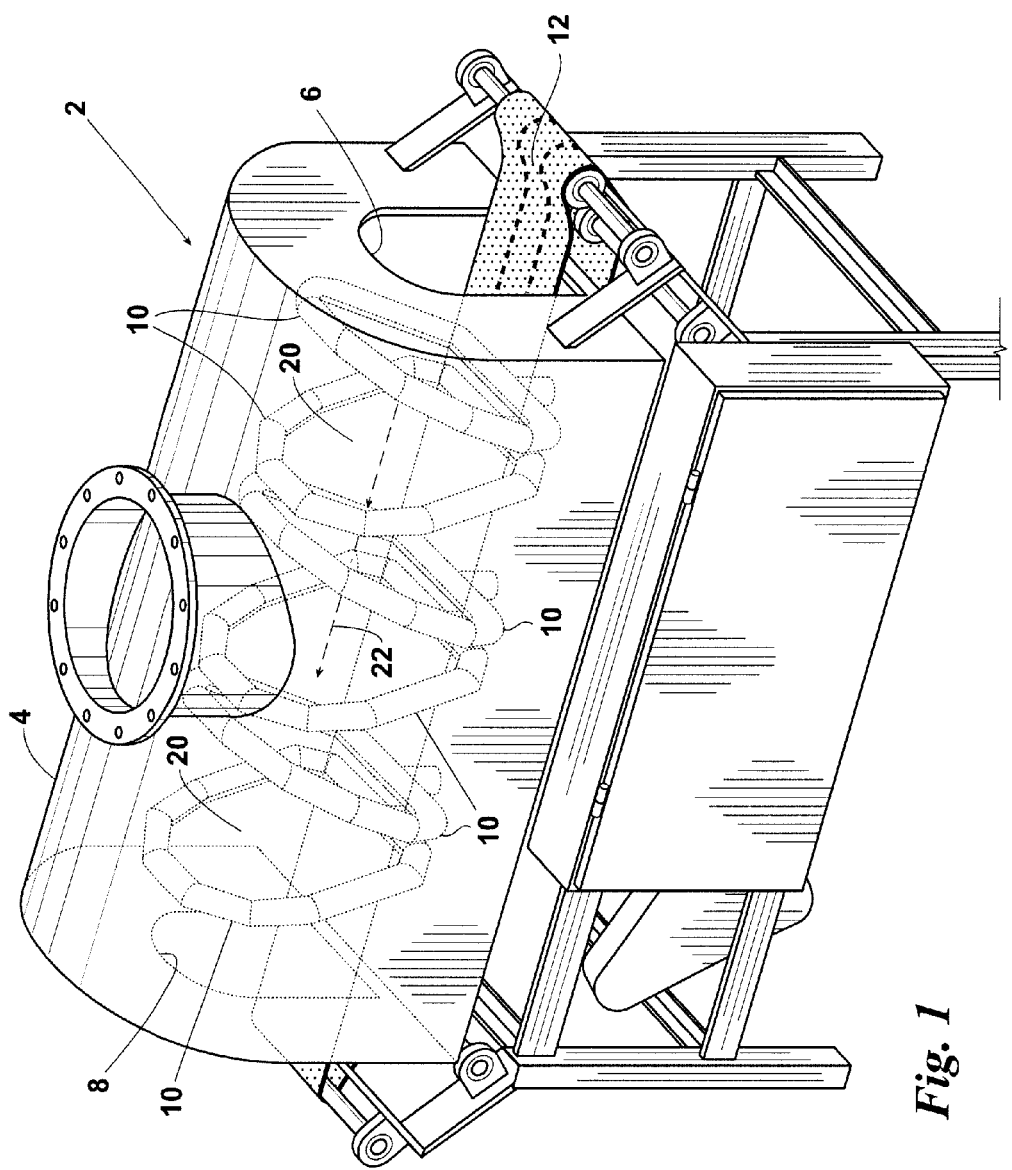
FIG. 1 is a perspective view of an embodiment 2 of the continuous surface-roasting apparatus provided by the present invention.

An embodiment 2 of the continuous surface-roasting apparatus provided by the present invention is illustrated in FIGS.

1 and 2. The inventive roasting apparatus 2 preferably comprises: an elongate housing 4 having an inlet end opening 6 and an outlet opening 8; one or more, preferably a series of, inventive loop burner elements 10 installed within the housing 4; and a conveyor 12 which extends through the housing 4 and through each loop burner 10 for continuously conveying the food product 14 through the loop burner(s) 10. The conveyor 12 will preferably be a stainless steel wire mesh belt or other type of conveyor which will permit the flame emitted from the lower portion of each loop burner element 10 to pass through the conveyor 12 for contacting the bottom portion of the product 14.

A preferred embodiment of the loop burner 10 provided by the present invention is illustrated in FIGS. 3-6. The inventive loop burner element 10 preferably comprises: a burner conduit 16 which is in the form of a continuous loop; an inlet connection 18 preferably provided on the lower portion of the conduit loop 16 for receiving a fuel and air mixture; an interior opening 20 which extends longitudinally (i.e., along the longitudinal direction of product travel 22) through the conduit loop 16, whereby the food product 14 will be delivered through the interior opening 20 of the burner loop 16 during the surface-roasting operation; a continuous flame slot 24 which extends around the entire interior of the conduit loop 16 and therefore surrounds the entire interior opening 20 of the burner element 10; and a ribbon flame element 26 which is positioned in the continuous flame slot 24 and also preferably surrounds the entire interior opening 20 of the loop burner element 10. The continuous flame slot 24 and the ribbon flame element 26 positioned therein preferably entirely surround and face radially inward toward the interior opening 20 of the loop burner element 10 such that a continuous ribbon flame 28 is discharged radially into the interior opening 20 from the ribbon flame element 26 around the perimeter (preferably around the entire perimeter) of the interior opening 20.

Figure 2:
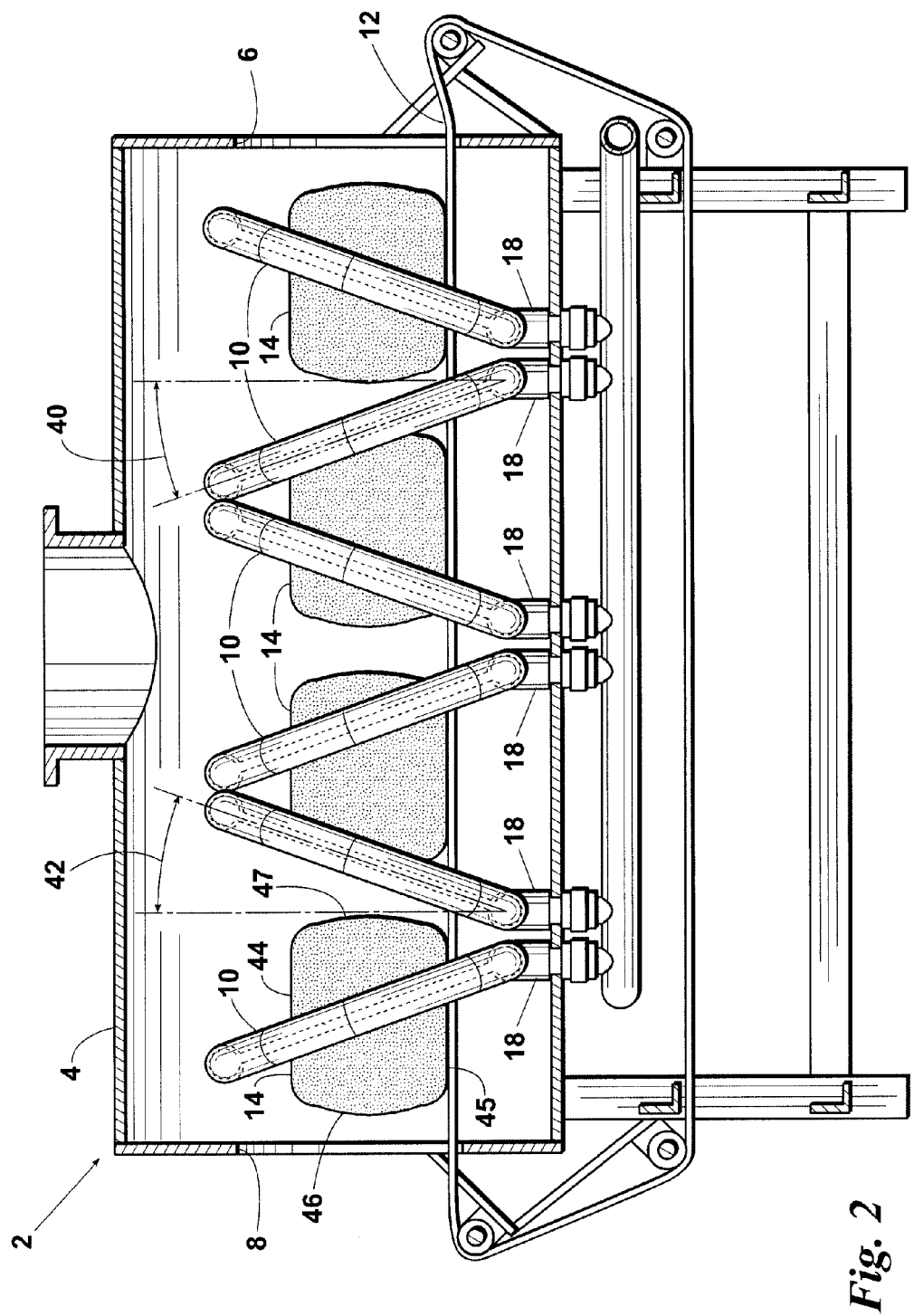
FIG. 2 is a cutaway elevational side view of the inventive continuous surface-roasting apparatus 2.

As indicated above, and as illustrated in FIGS. 1 and 2, the inventive loop burner element(s) 10 will preferably be positioned laterally within the roaster housing 4 such that the conveyor 12 extends through the interior opening(s) 20 of the loop burner element(s) 10. The embodiment of the loop burner 10 shown in FIGS. 3-6 has a loop shape and size which are adapted to conform to the shapes and surface contours of hams, deli turkey breasts, and similar products 14. In this configuration, the burner element loop 16 comprises: a straight, horizontal lower segment 30 which preferably extends laterally beneath the conveyor 12 for roasting the exterior bottom portion of the food product 14; a curved upper segment 32 which preferably extends laterally above the conveyor 12 for roasting the exterior top portion of the food product; and two opposing side segments 34 and 36 which extend downwardly (i.e., either straight downwardly or at a downward angle or downward curve) from the lateral ends of the upper segment 32 for flame roasting the lateral sides of the food product 14 as it passes through the burner conduit loop 16. The burner loop 16 could also, for example, have a D-shape such that the top and side segments of the loop form a continuous arching curve.

In reference to the curved upper segment 32 and to other features of the inventive burner 10, the terms "curved" and "curved segment" refer to and include both segmented curved structures as illustrated in FIGS. 3-6 or structures which either follow a smooth curve or include both smooth curved and segmented curved portions. It will also be understood that the upper lateral segment 32 could have an inverted V-shape, or could be a straight horizontal segment, or could be of any other configuration desired for surface-roasting a particular product.

If desired, the loop burners 10 can be installed vertically within the roaster housing 4 such that they are oriented at a 90° angle with respect to the longitudinal direction of travel 22 of the conveyor 12. However, it is more preferred that the inventive apparatus 2 include a plurality of loop burner elements 10 which are each oriented at a forward leaning angle 40 or rearward leaning angle 42 with respect to the direction of travel 22 of the conveyor 12 as illustrated in FIGS. 1 and 2. The forward leaning or rearward leaning angle 40, 42 of each loop burner element 10 will preferably be in the range of from about 5° to about 60° from vertical and will more preferably be in the range of from about 10° to about 50° from vertical (most preferably about 20°). Moreover, the inventive surface-roasting apparatus 2 will preferably contain a series of at least two (more preferably at least four and most preferably at least six) loop burner elements 10 which are alternately oriented at forwardly and rearwardly leaning angles 40, 42 with respect to the direction of travel 22 of the conveyor 12 as illustrated in FIGS. 1 and 2.

The use of forwardly leaning and rearwardly leaning loop burner elements 10 in this manner operates to change the angle at which the ribbon flame contacts at least the upper 44, bottom 45, leading 46, and trailing 47 surfaces of the product 14 in order to (a) ensure that the leading and trailing surfaces 46 and 47 are flame-roasted in a manner matching the remainder of the product and (b) better simulate the result provided when using a hand torch.

The non-linear continuous ribbon flame 28 provided by the inventive loop burner 10 will preferably be a high intensity heat flame which contacts the outer surface of the food product 14 at a temperature in the range of from about 1000° to about 2000° F. or more. The size of the burner conduit loop 16 will also preferably be such that the flame discharge slot 24 extending around the interior of the burner loop conduit 16 is within 12 inches, more preferably within six inches, and most preferably from about three inches to about one inch or less, from the surface of the food product 14.

Although it is preferred that the continuous loop burner 10 be used for purposes of better operation and control and for obtaining better and more consistent results, it will be understood that a non-continuous burner element or element assembly could be used in the inventive surface-roasting apparatus 2. For example, a near-continuous element similar to element 10 illustrated in FIGS. 3-6, but having a break at some location therein, could be used. As another alternative, the upper inverted U-shaped portion 48 of the burner element 10 illustrated in FIGS. 2-4 could be entirely separate from the lower horizontal portion 30 of the burner element which extends beneath the conveyor 12. In yet another alternative, any number of desired separate burner segments could alternatively be used together in a configuration resembling the shape of the continuous burner element 10 illustrated in FIGS. 3-6. Furthermore, if it is not necessary that the bottom surface of the food product 14 be roasted, the lower horizontal segment 30 of the burner could be omitted such that the burner would be comprised of only the upper inverted U-shaped portion 48 for roasting the top, side, leading and trailing portions of the food product 14.

The ribbon flame element 26 will preferably be a ribbon flame element of the type heretofore employed in linear blue ribbon burners used, for example, in continuous flame grilling apparatuses for searing the upper surfaces of burger or sausage patties. The ribbon flame element 26 will preferably be a stainless steel element which is in the form of a wire mesh or a plate 27 having circular or other perforations 29 therethrough.

The ribbon flame element 26 provides excellent flame retention and uniform heat distribution. The flame slot 24 and ribbon flame element 26 will preferably be sized to provide a flame width in the range of from about 1 to about 25 mm. The width of the burner flame will more preferably be in the range of from about 2 to about 15 mm and will most preferably in the range of from about 3 to about 8 mm.

Examples of meat, poultry, and fish products 14 which can be surface flame-roasted in the inventive apparatus 2 include, but are not limited to, Virginia hams, whole muscle deli ham lobes, emulsified ham-shaped products, emulsified ham lobes or logs, comparable turkey ham products, skin-on turkey breast meat, skin-on ham products, whole birds (e.g., turkey or chicken), whole muscle beef products, roast beef, prime rib roasts, leg of lamb, etc. As used herein and in the claims, the general term "ham" refers to both actual ham and turkey ham products of all types. Also, in addition to meat, poultry, and fish products, other types of products which can be surface-roasted in the inventive apparatus 2 include, but are not limited to, tomatoes, potatoes, peppers, garlic, onions, corn on the cob, pineapple, cactus leaves, and artichokes.

The meat, poultry, or fish product 14 processed in the inventive surface-roasting apparatus 2 can have a bare surface or can be a product having a layer of fat or skin thereon. Also, in any case, the inventive method can further comprise the step of pretreating the product surface, prior to surface-roasting in the inventive apparatus 2, by, for example, (a) applying one or more coatings to the product surface, (b) preheating the product surface, (c) applying liquid smoke or other browning agent to the product surface, or (d) any combination thereof. Examples of possible surface coatings include, but are not limited to: sugar; sugar glaze; honey; caramel; spice mixes; barbecue sauce; dry rubs; chili powder or flake; paprika; herbs; wet glazes such as salsa; and combinations thereof. It will also be understood that, in the case of emulsified food products, a "honey glazed" or "caramelized" product can be produced using the inventive surface-roasting apparatus 2 by including honey or a caramelizing agent in the emulsion mix prior to forming.

Although the inventive apparatus and method can be used for surface-roasting either raw or already cooked products, the inventive apparatus and method are particularly well suited for surface-roasting ready-to-eat (RTE) ham or turkey products or other products which have already been cooked (e.g., products which have already been cooked in cooking bags). Many such RTE products are also typically thoroughly chilled after cooking. Consequently, for example, the inventive apparatus and method can be used for surface-roasting ready-to-eat (RTE) and other already-cooked products which (a) have been chilled after cooking so that they are cold throughout when introduced into the surface-roasting apparatus 2, (b) are still warm from cooking or other processing, or (c) have a warm surface but a cold interior core temperature.

If desired, the inventive surface-roasting process can also be used as a prepackaging surface pasteurization procedure wherein the lethality provided by the inventive surface flame treatment is captured when placing the food product in its retail sale bag or other packaging. In order to most effectively capture the surface pasteurization lethality provided by the inventive surface-roasting process, the food product will preferably be packaged warm without any intervening cooling procedure being preformed between the surface-roasting step and the packaging process. Specifically, to best retain the pasteurization benefit, an already cooked ham or other already cooked product will preferably not be conducted through or otherwise placed in any refrigerated cooling apparatus operating at more than 20° F. (more preferably not more than 10° F.) below room temperature conditions between the surface-roasting step and the packaging step.

Alternatively, however, it may be desirable to chill the surface-roasted product prior to packaging. For example, in the case of surface-roasted products produced such that a fragile particulate material remains on or is formed on the product surface, the product can be flash chilled or subjected to freeze-crusting or other surface freezing procedures in order to more firmly set the particulate material on the product surface prior to the packaging operation.

Figure 7:
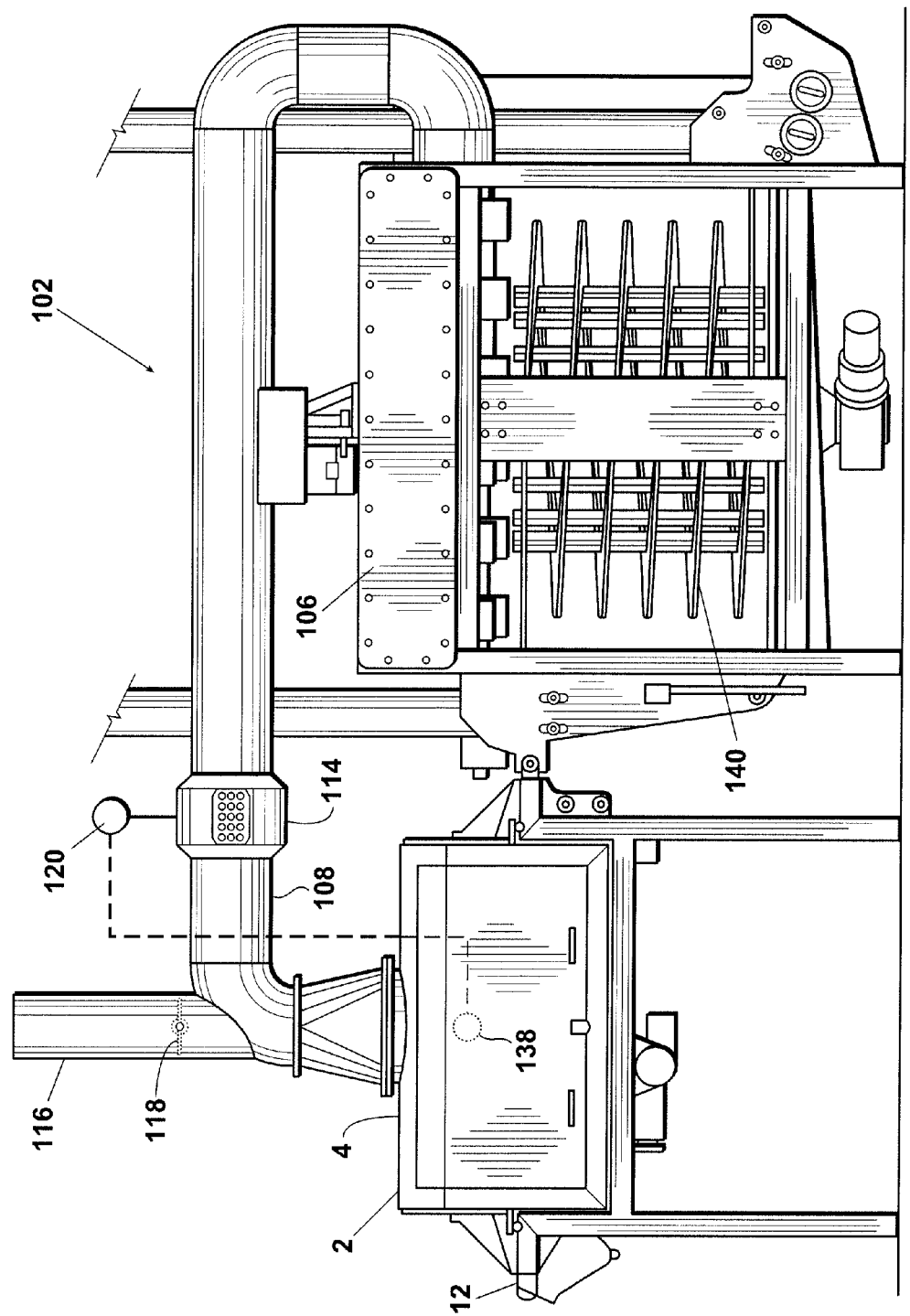
FIG. 7 illustrates an embodiment 102 of a combination cooking and surface-roasting system provided by the present invention.

An example of another processing system 102 employing the inventive surface-roasting apparatus 2 is depicted in FIG. 7. The inventive system 102 comprises: the inventive roasting apparatus 2; an oven 106 for cooking the ham or other food product 14; a vapor conduit 108 extending between the inventive surface-roasting apparatus 2 and the oven 106 for delivering at least a portion of the product vapor generated by the surface-roasting process into the interior of the oven 106; an extraction fan 114 positioned in the vapor conduit 108 for extracting the vapor product from the flame-roasting apparatus 2 and delivering at least a portion thereof to the oven 106 via the vapor conduit 108; a bypass duct 116 having a damper 118 positioned therein for allowing at least a portion of the product vapor produced by the surface-roasting apparatus 2 to be discharged to the atmosphere or to other processing units; and a controller 120 for automatically controlling the rate of vapor extraction from the roasting apparatus 2 in order to preferably automatically maintain a desired vapor product temperature condition either (a) within the housing 4 of the surface-roasting apparatus 2, (b) within the vapor conduit 108, (c) or within the oven 106.

Although the cooking oven 106 can be positioned either upstream or downstream of the surface-roasting apparatus 2, the oven 106 will preferably be located upstream of the roaster 2 for cooking the product 14 prior to performing the surface-roasting step. Further, the oven 106 will preferably be a spiral oven having a spiral conveyor 140 for carrying the food product upwardly or downwardly (preferably upwardly) through the oven in a spiral pattern.

The vapor produced within the inventive roasting apparatus 2 can comprise: vaporized fat, water, or other materials from the food product 14; smoke; air; and combustion products resulting from the use of the flame burner(s) 10 within the roasting apparatus 2.

In the inventive system and method 102, the product carried through the spiral oven or other oven 106 is cooked in the presence of some or all of the product vapor which is continuously produced in the surface-roasting apparatus 2. The inventive system and method 102 therefore significantly improve the flavor and color development of the product which occurs in the cooking oven 106 by allowing the product's own fats and juices from the surface-roasting apparatus 2 to contact and caramelize around the food product while it cooks.

In addition, the inventive system 102 greatly improves the energy efficiency of the overall process by using the heat content of the imported hot roasting product vapor for cooking the food product in the oven 106, thus greatly reducing the demand which would otherwise be placed on the oven heating system. Consequently, in the inventive system and process 102, the oven heating system can be controlled to simply provide whatever supplemental heat is required to maintain a desired cooking temperature within the oven 106. In the event that either (a) the heat provided by the entire vapor product stream would cause the temperature within the oven 106 to exceed the desired cooking temperature and/or (b) it is desired to use less than the full roasting product vapor stream in the oven 106 in order to achieve a particular product flavor or appearance, any desired portion of the product vapor stream from the inventive surface-roasting apparatus 2 can be discharged via the bypass duct 116 by manually setting or automatically controlling the bypass duct damper 118.

In the inventive system and method 102, the extraction of hot vapor product from the roasting apparatus 2 is preferably automatically controlled using controller 120 to maintain a desired temperature condition, as mentioned above, of the roasting product vapor either within the roasting apparatus housing 4 or the vapor conduit 108. As a result, for any particular product being treated, and for any authentic surface color, degree of darkness, flavor etc., the inventive system and method desirably operate to ensure that sufficient product vapor is retained in the surface-roasting apparatus 2 to consistently maintain an optimum vapor temperature environment therein for achieving such result, but without exceeding the design temperature limits of the apparatus 2.

In many cases, the optimum temperature environment within the surface-roasting apparatus 2 for achieving the desired result will be higher, and sometimes significantly higher, than the temperature conditions which would otherwise exist if all of the product vapor were simply allowed to flow, unhindered, out of an exhaust duct. This result is surprising in view of the fact that the temperature of the flame contacting the product will typically be in the range of from 1000 to 2000° F. or higher, thus seemingly rendering the temperature of the exiting vapor, which will still be lower than the flame temperature even when operating at the inventive optimum higher vapor temperature conditions, insignificant. The exhaust rate from the inventive roasting apparatus 2 will preferably be controlled such that the temperature of the product vapor withdrawn from the apparatus 2 is at least 140° F., more preferably in the range of from about 300° F. to about 500° F. and most preferably from about 350° F. to about 450° F.

It is believed that, because the inventive control system operates to produce and maintain higher vapor environment temperatures in the surface-roasting apparatus 2 by, in effect, causing more vapor product to be retained in the apparatus 2, the inventive system may also enhance the degree of product flavor absorption and surface treatment in the surface-roasting apparatus 2 itself by, in part, increasing to some degree the pressure and density of the vapor product retained in the roaster 2. Although the immediate surface of the product already achieves a very high temperature when passing through the burner element(s) 10 such that, in many if not all cases, the immediate surface temperature will exceed even the enhanced vapor product temperature provided and controlled by the present invention, the inventive system likely still surprisingly and unexpectedly improves surface and flavor results in the surface-roasting apparatus 2 by reducing surface temperature fluctuations and losses which may otherwise occur as the product travels between the loop burner elements 10, thus causing a higher beginning temperature of the immediate outer surface of the product to be maintained and built upon as the product travels from one burner to the next.

In the inventive system and method 102, the controller 120 preferably receives an operating temperature input from one or more temperature sensors 138 and operates to control the determined temperature of the vapor product at a desired set point, or within a set point range, by automatically varying the speed of the extraction fan 114 installed in the vapor product conduit 108. The adjustment of the fan speed can be performed directly or indirectly by any desired manner known in the art. Alternatively, a constant speed fan could be employed and the controller 120 could be used, for example, to control a damper, valve, or other device within the vapor conduit 108 in order to vary the vapor extraction rate from the roasting apparatus 2. It will also be understood that the inventive vapor extraction and control system depicted in FIG. 7 and discussed above can be used to improve the operation of the inventive surface-roasting apparatus 2 regardless of whether the inventive roasting apparatus 2 is used in conjunction with a cooking oven 106 or other processing equipment.

The color, caramelization, and other desired surface characteristics produced on the food product 14 in accordance with the inventive method can be selected and controlled, for example, by (a) using the control system described above or other system for controlling the vapor temperature environment within the roasting apparatus 2; (b) varying the velocity and/or temperature of the burner flame; (c) varying the proximity of the burner flame slots 24 to the product; and/or (d) varying the number of loop burner elements 10 which are operated in the apparatus when surface-roasting a particular product.

Also, in order to further fine tune the surface color and flavor effects provided, the inventive roasting apparatus 2 can further include valving to control the mix of oxygen/air and fuel delivered to the burner(s) 10 whereby the operation of the burner(s) 10 can be manually or automatically adjusted so that the burner(s) 10 will emit and maintain a burner flame having a targeted color. Using the color of the burner flame as a primary parameter for setting the output of the burner(s) 10 provides significant benefits. For example, some products will preferably be roasted using a less intense, lower temperature yellow flame which allows a longer residence time for achieving desired caramelized flavors but with a less singed appearance. Other products will preferably be roasted using a more intense, higher temperature blue flame to obtain a more singed surface appearance and texture.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the invention as defined by the claims.

What is claimed is:

1. An apparatus for surface-roasting a food product comprising:
    a housing;
    a conveyor for carrying said food product through said housing; and
    a series of at least two pairs of non-linear ribbon flame burners surrounded by said housing for discharging a ribbon of flame for surface-roasting said food product, one non-linear ribbon flame burner in each of said pairs being oriented at a forward leaning angle with respect to a direction of travel of said conveyor in said housing and the other non-linear ribbon flame burner in each of said pairs being oriented at an equal but opposite rearward leaning angle, the forward and rearward leaning angles being in a range of from about 5° to about 60° from vertical, the series being arranged so said food product being conveyed through the series on said conveyor is continuously contacted by said ribbon flame;
    wherein each said non-linear ribbon flame burner comprises:

an upper segment which extends laterally over said conveyor for discharging an upper portion of said ribbon flame toward a top portion of said food product;

a first side segment which extends downwardly from a first end of said upper segment for discharging a first side portion of said ribbon flame toward a first side portion of said food product; and a second side segment which extends downwardly from a second end of said upper segment for discharging a second side portion of said ribbon flame toward a second side portion of said food product;

said ribbon flame being a flame that extends along the entire length of each said upper, first side, and second side segments.

2. The apparatus of claim 1 wherein said upper segment has a curved shape.

3. The apparatus of claim 2 wherein said curved shape is a segmented curved shape.

4. The apparatus of claim 1 wherein each said non-linear ribbon flame burner further comprises a lower segment which extends beneath said conveyor for discharging a lower portion of said ribbon flame toward a bottom exterior portion of said food product.

5. The apparatus of claim 4 wherein each said non-linear ribbon flame burner forms a continuous loop through which said conveyor travels, said continuous loop comprising said upper segment, said first side segment, said second side segment, and said lower segment.

6. The apparatus of claim 5 wherein said ribbon flame forms a continuous ribbon flame loop through which said conveyor travels, said continuous ribbon flame loop comprising said upper portion of said ribbon flame, said first side portion of said ribbon flame, said second side portion of said ribbon flame, and said lower portion of said ribbon flame.

7. The apparatus of claim 5 wherein said upper segment has a curved shape.

8. The apparatus of claim 7 wherein said curved shape is a segment curved shape.

9. The apparatus of claim 5 further comprising:
a continuous flame slot in said continuous loop and
a ribbon flame element positioned in said continuous flame slot for discharging said ribbon flame.

10. The apparatus of claim 1 further comprising:
a vapor conduit extending from said housing and
an extraction fan in said vapor conduit for extracting, at an extraction rate, at least a portion of a vapor product produced in said housing.

11. The apparatus of claim 10 further comprising a continuous oven wherein said food product is cooked, said vapor conduit extending to said continuous oven for delivering at least a portion of said vapor product into said continuous oven such that said food product can be cooked in said continuous oven in an environment comprising at least a portion of said vapor product.

12. The apparatus of claim 11 wherein said continuous oven is a spiral oven having a conveyor therein for conveying said food product within said spiral oven in a spiral pattern.

13. The apparatus of claim 10 further comprising:
a temperature sensor in said housing or in said vapor conduit for determining a temperature condition of said vapor product and
a controller for automatically controlling said extraction rate to maintain said temperature condition of said vapor product.

14. The apparatus of claim 1 further comprising:
a continuous oven wherein said food product is cooked and
a vapor conduit extending between said housing and said continuous oven for delivering at least a portion of a vapor product produced in said housing into said continuous oven such that said food product can be cooked in said continuous oven in an environment comprising at least a portion of said vapor product from said housing.

\* \* \* \* \*